United States Patent
Banga et al.

(10) Patent No.: US 9,116,733 B2
(45) Date of Patent: *Aug. 25, 2015

(54) AUTOMATED PROVISIONING OF SECURE VIRTUAL EXECUTION ENVIRONMENT USING VIRTUAL MACHINE TEMPLATES BASED ON REQUESTED ACTIVITY

(71) Applicant: Bromium, Inc., Cupertino, CA (US)

(72) Inventors: Gaurav Banga, Cupertino, CA (US); Kiran Bondalapati, Los Altos, CA (US); Ian Pratt, Cambridge (GB); Vikram Kapoor, Cupertino, CA (US)

(73) Assignee: Bromium, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/610,282

(22) Filed: Jan. 30, 2015

(65) Prior Publication Data

US 2015/0143374 A1 May 21, 2015

Related U.S. Application Data

(63) Continuation-in-part of application No. 13/115,354, filed on May 25, 2011, now Pat. No. 8,972,980, and a continuation-in-part of application No. 13/419,345, filed on Mar. 13, 2012, and a continuation-in-part of application No. 13/526,423, filed on Jun. 18, 2012.

(60) Provisional application No. 61/349,717, filed on May 28, 2010.

(51) Int. Cl.
- *G06F 9/455* (2006.01)
- *G06F 21/53* (2013.01)
- *G06F 21/00* (2013.01)
- *G06F 21/57* (2013.01)
- *G06F 21/56* (2013.01)

(52) U.S. Cl.
CPC ............ *G06F 9/45533* (2013.01); *G06F 9/455* (2013.01); *G06F 21/00* (2013.01); *G06F 21/53* (2013.01); *G06F 21/56* (2013.01); *G06F 21/577* (2013.01); *G06F 2009/45562* (2013.01); *G06F 2009/45587* (2013.01)

(58) Field of Classification Search
None
See application file for complete search history.

(56) References Cited

U.S. PATENT DOCUMENTS

| 5,778,173 A | 7/1998 | Apte |
|---|---|---|
| 6,018,342 A | 1/2000 | Bristor |

(Continued)

FOREIGN PATENT DOCUMENTS

WO 2008073618 A2 6/2008

*Primary Examiner* — Emerson Puente
*Assistant Examiner* — Benjamin Wu
(74) *Attorney, Agent, or Firm* — Brokaw Patent Law PC; Christopher J. Brokaw

(57) ABSTRACT

Approaches for executing untrusted software on a client without compromising the client using micro-virtualization to execute untrusted software in isolated contexts. A template for instantiating a virtual machine on a client is identified in response to receiving a request to execute an application. After the template is identified, without human intervention, a virtual machine is instantiated, using the template, in which the application is to be executed. The template may be selected from a plurality of templates based on the nature of the request, as each template describe characteristics of a virtual machine suitable for a different type of activity. When the client determines that the application has ceased to execute, the client ceases execution of the virtual machine without human intervention.

24 Claims, 9 Drawing Sheets

(56) References Cited

U.S. PATENT DOCUMENTS

| | | | |
|---|---|---|---|
| 6,108,799 A | 8/2000 | Boulay et al. |
| 6,122,741 A | 9/2000 | Patterson et al. |
| 6,789,156 B1 | 9/2004 | Waldspurger |
| 6,948,044 B1 | 9/2005 | Chandrasekaran |
| 6,959,420 B1 | 10/2005 | Mitchell et al. |
| 7,139,799 B2 | 11/2006 | Qian et al. |
| 7,171,523 B2 | 1/2007 | Yamasaki |
| 7,506,265 B1 | 3/2009 | Traut et al. |
| 7,836,303 B2 | 11/2010 | Levy et al. |
| 7,971,047 B1 | 6/2011 | Vlaovic et al. |
| 7,979,807 B2 | 7/2011 | Subramaniam |
| 7,996,834 B2 | 8/2011 | Araujo, Jr. et al. |
| 8,112,748 B2 | 2/2012 | Pomerantz |
| 8,146,084 B1 | 3/2012 | Meketa |
| 8,151,263 B1 | 4/2012 | Venkitachalam et al. |
| 8,171,141 B1 | 5/2012 | Offer et al. |
| 8,219,987 B1 | 7/2012 | Vlaovic et al. |
| 8,346,727 B1 | 1/2013 | Chester et al. |
| 8,347,263 B1 | 1/2013 | Offer |
| 8,391,494 B1 | 3/2013 | Serenyi |
| 8,392,993 B1 | 3/2013 | Oliver |
| 8,407,438 B1 | 3/2013 | Ranade |
| 8,543,641 B2 | 9/2013 | Cherukuri et al. |
| 8,561,208 B2 | 10/2013 | Corbett et al. |
| 8,601,583 B1 | 12/2013 | Chandrasekhar et al. |
| 8,656,386 B1 | 2/2014 | Baimetov et al. |
| 8,752,047 B2 | 6/2014 | Banga et al. |
| 8,763,136 B2 | 6/2014 | Li |
| 8,776,169 B2 | 7/2014 | Rajagopal et al. |
| 8,776,240 B1 | 7/2014 | Wu et al. |
| 2003/0070089 A1 | 4/2003 | Fu et al. |
| 2003/0204569 A1 | 10/2003 | Andrews et al. |
| 2004/0128670 A1 | 7/2004 | Robinson et al. |
| 2005/0021994 A1 | 1/2005 | Barton et al. |
| 2005/0149726 A1 | 7/2005 | Joshi et al. |
| 2005/0188272 A1 | 8/2005 | Bodorin et al. |
| 2005/0273866 A1 | 12/2005 | Brown et al. |
| 2006/0101189 A1 | 5/2006 | Chandrasekaran et al. |
| 2006/0112342 A1 | 5/2006 | Bantz et al. |
| 2006/0136910 A1 | 6/2006 | Brickell et al. |
| 2006/0143617 A1 | 6/2006 | Knauerhase et al. |
| 2006/0184937 A1 | 8/2006 | Abels et al. |
| 2006/0288343 A1 | 12/2006 | Pallister |
| 2007/0089111 A1 | 4/2007 | Robinson et al. |
| 2007/0157307 A1 | 7/2007 | Katoh et al. |
| 2007/0180450 A1 | 8/2007 | Croft et al. |
| 2007/0192329 A1 | 8/2007 | Croft et al. |
| 2007/0198656 A1 | 8/2007 | Mazzaferri et al. |
| 2007/0234337 A1 | 10/2007 | Suzuki et al. |
| 2007/0250833 A1 | 10/2007 | Araujo et al. |
| 2008/0001958 A1 | 1/2008 | Vembu et al. |
| 2008/0059556 A1 | 3/2008 | Greenspan et al. |
| 2008/0072276 A1 | 3/2008 | Pouliot |
| 2008/0086779 A1 | 4/2008 | Blake et al. |
| 2008/0127348 A1* | 5/2008 | Largman et al. ............ 726/24 |
| 2008/0133722 A1 | 6/2008 | Ramasundaram et al. |
| 2008/0148400 A1 | 6/2008 | Barron et al. |
| 2008/0209138 A1 | 8/2008 | Sheldon et al. |
| 2008/0244028 A1 | 10/2008 | Le et al. |
| 2008/0244579 A1 | 10/2008 | Muller |
| 2008/0271017 A1 | 10/2008 | Herington |
| 2008/0320590 A1 | 12/2008 | Craft et al. |
| 2009/0007242 A1 | 1/2009 | Subramanian et al. |
| 2009/0070869 A1 | 3/2009 | Fan et al. |
| 2009/0119541 A1 | 5/2009 | Inoue et al. |
| 2009/0125902 A1 | 5/2009 | Ghosh et al. |
| 2009/0158140 A1 | 6/2009 | Bauchot et al. |
| 2009/0165133 A1 | 6/2009 | Hwang et al. |
| 2009/0172660 A1 | 7/2009 | Klotz et al. |
| 2009/0172820 A1 | 7/2009 | Watson |
| 2009/0249472 A1 | 10/2009 | Litvin et al. |
| 2009/0260007 A1 | 10/2009 | Beaty et al. |
| 2009/0276783 A1 | 11/2009 | Johnson et al. |
| 2009/0284535 A1 | 11/2009 | Pelton et al. |
| 2009/0300599 A1 | 12/2009 | Piotrowski |
| 2009/0313620 A1 | 12/2009 | Sedukhin et al. |
| 2009/0328033 A1 | 12/2009 | Kohavi et al. |
| 2009/0328221 A1 | 12/2009 | Blumfield et al. |
| 2010/0017756 A1 | 1/2010 | Wassom, Jr. et al. |
| 2010/0058042 A1 | 3/2010 | Locker et al. |
| 2010/0122343 A1 | 5/2010 | Ghosh et al. |
| 2010/0192224 A1 | 7/2010 | Ferri et al. |
| 2010/0199199 A1 | 8/2010 | Kumar et al. |
| 2010/0235831 A1 | 9/2010 | Dittmer |
| 2010/0251388 A1 | 9/2010 | Dorfman |
| 2010/0257523 A1 | 10/2010 | Frank |
| 2010/0299667 A1 | 11/2010 | Ahmad et al. |
| 2011/0022694 A1 | 1/2011 | Dalal et al. |
| 2011/0023028 A1 | 1/2011 | Nandagopal et al. |
| 2011/0035494 A1 | 2/2011 | Pandey et al. |
| 2011/0154431 A1* | 6/2011 | Walsh ............................ 726/1 |
| 2011/0173251 A1 | 7/2011 | Sandhu et al. |
| 2011/0209140 A1 | 8/2011 | Scheidel et al. |
| 2011/0258441 A1* | 10/2011 | Ashok et al. ............... 713/168 |
| 2011/0258621 A1 | 10/2011 | Kern |
| 2011/0296412 A1 | 12/2011 | Banga et al. |
| 2011/0296487 A1 | 12/2011 | Walsh |
| 2011/0302577 A1 | 12/2011 | Reuther et al. |
| 2012/0005672 A1 | 1/2012 | Cervantes et al. |
| 2012/0089666 A1 | 4/2012 | Goswami et al. |
| 2012/0089980 A1 | 4/2012 | Sharp et al. |
| 2012/0246598 A1 | 9/2012 | Narayanan |
| 2012/0254860 A1 | 10/2012 | Bozek et al. |
| 2012/0260250 A1 | 10/2012 | Maeda et al. |
| 2012/0288012 A1 | 11/2012 | Staikos et al. |
| 2012/0297383 A1 | 11/2012 | Meisner et al. |
| 2012/0311560 A1 | 12/2012 | Dobrovolskiy et al. |
| 2013/0024644 A1 | 1/2013 | Givargis et al. |
| 2013/0091570 A1 | 4/2013 | McCorkendale et al. |
| 2013/0159987 A1 | 6/2013 | Shi et al. |
| 2013/0191924 A1* | 7/2013 | Tedesco et al. ............ 726/26 |
| 2013/0246563 A1 | 9/2013 | Cardozo |
| 2013/0254829 A1 | 9/2013 | Jakubowski et al. |
| 2013/0283266 A1 | 10/2013 | Baset et al. |
| 2013/0288647 A1 | 10/2013 | Turgeman |
| 2013/0305244 A1* | 11/2013 | Pohlmann et al. ............ 718/1 |
| 2014/0068756 A1 | 3/2014 | Dorfman |
| 2014/0123319 A1 | 5/2014 | Porjo et al. |
| 2014/0143825 A1 | 5/2014 | Behrendt et al. |
| 2014/0201525 A1 | 7/2014 | Korthny et al. |
| 2014/0351810 A1 | 11/2014 | Pratt et al. |
| 2015/0089497 A1* | 3/2015 | Borzycki et al. ............ 718/1 |

* cited by examiner

AUTOMATED PROVISIONING OF SECURE VIRTUAL EXECUTION ENVIRONMENT USING VIRTUAL MACHINE TEMPLATES BASED ON REQUESTED ACTIVITY

CLAIM OF PRIORITY

This application is a continuation-in-part of, and claims priority to, U.S. patent application Ser. No. 13/115,354, filed May 25, 2011, entitled "Approaches for Securing an Internet Endpoint Using Fine-Grained Operating System Virtualization," the contents of which are hereby incorporated by reference for all purposes as if fully set forth herein.

U.S. patent application Ser. No. 13/115,354 claims priority to U.S. provisional patent application No. 61/349,717, filed May 28, 2010, entitled "System and Method for Securing an Internet Endpoint using fine-grained Full OS Virtualization," the contents of which are hereby incorporated by reference for all purposes as if fully set forth herein.

This application is also a continuation-in-part of, and claims priority to, U.S. patent application Ser. No. 13/419,345, filed Mar. 13, 2012, entitled "Seamless Management of Untrusted Data Using Virtual Machines," the contents of which are hereby incorporated by reference for all purposes as if fully set forth herein.

This application is also a continuation-in-part of, and claims priority to, U.S. patent application Ser. No. 13/526,423, filed Jun. 18, 2012, entitled "Securing Resources of a Virtual Machine," the contents of which are hereby incorporated by reference for all purposes as if fully set forth herein.

FIELD OF THE INVENTION

Embodiments of the invention relate to the use of isolated environments to execute potentially malicious code.

BACKGROUND

Ensuring the security of Internet users and Internet connected devices is one of the grand challenges facing us today. The current state of affairs is very problematic, as our cyber-security infrastructure is easily and routinely subverted by cyber criminals, resulting in great economic loss. Every year brings deeper and more complex dependence by society on our cyber-infrastructure, and yet at the same time the cyber-security problem only worsens as the capabilities of the cyber-criminal mature. In effect, we are building mission-critical dependence into virtually every aspect of human activities on a cyber-infrastructure that is very insecure at its core.

The current state of our cyber-security infrastructure is due to two fundamental limitations. The first limitation is a fundamental mismatch between the design assumptions made by computer security programmers with how the vast majority of users interact with the cyber-infrastructure (the "Security Model Complexity" problem. The second limitation is a lack of appropriate isolation of code and data from trusted and untrusted sources in modern computer systems (the "Lack of Isolation" problem). These two limitations of current systems are somewhat orthogonal, but are both very important for securing an endpoint. The "Lack of Isolation" problem, in particular is very important because modern computer systems that are used for everyday computing as endpoints are typically general purpose devices capable of running a vast variety of software from different sources.

The general purpose capability of modern endpoint systems is constructed using a layered stack of hardware and software. An example of the layered arrangement of hardware and software that is present in modern computer systems is shown in FIG. 1. At the lowest layer, there is hardware with a small number of basic general purpose programming capabilities. Upon this hardware layer sits the firmware and operating system (OS) layers. The firmware and OS layers provide higher-level but broad capabilities such as managing specific devices, files, and/or processes. On top of the OS layer run the various applications which provide user-visible rich functionality to the computer. The functionality provided by the application layer is typically the primary concern of the computer user.

One advantage and consequence of the layered nature of modern computer systems is that the various layers may come from different vendors, as long as the layers conform to the specifications governing the layer boundary (which may be based on open or proprietary industry standards). To illustrate an example, in a typical PC today the hardware may be constructed around processor and chipset technology provided by Intel or AMD. The firmware/BIOS may be provided by companies like Insyde, AMI or Phoenix and may be written to conform to several industry specifications such as UEFI and PI. The operating system (OS) may originate from a company like Microsoft or Apple or may be a flavor of the Linux open source OS. Finally, the applications themselves are usually written to the specification of one of the operating systems and may be provided by one of a large multitude of application vendors.

Note that some of the applications may themselves have a layered architecture. A web browser, for example, typically includes a browser core and may also download web applications in the form of HTML, Javascript and Flash programs from various Internet web sites. The web browser may run these downloaded web applications locally on top of the browser core. A typical web page contains HTML with embedded JavaScript that can change the HTML being rendered by the web browser dynamically based on user actions without having to re-download the web page from the web server. The HTML may also demarcate part of the web page to be rendered by a plugin, which is typically a separate program that is installed on the computer. Plugins are also often downloaded from different sources over the World Wide Web. Thus, a modern computer runs code that comes from a variety of different sources. In particular, application programs may originate from literally millions of different sources once we consider the collection of traditional local applications as well as web applications that are downloaded from websites.

The integrity of a computer system when it runs application code from different sources (or even the same program being run by different users of a shared computer) has traditionally been one of the responsibilities of the OS. The OS uses various hardware and software constructs like virtual memory, processes, and file permissions to prevent programs belonging to one user from affecting programs (and data) belonging to another user. This responsibility of the OS to "isolate" programs and data from one another often tends to compete with another responsibility of the OS, which is to allow for co-operation between programs especially between user application programs and system level services such as shared library modules, database services, and other higher-level common OS functionality. These two OS functions, to share and to isolate, require the OS designer to make some tradeoffs on how much to share and how much to isolate.

As a result of these tradeoffs, the resulting implementation of modern operating systems tends to be overly complex and typically exhibit numerous bugs. In mature operating systems, the security implementation is typically robust enough to work well for normal programs under normal usage with no adverse impact on the operation of the computer. However, most OS implementations are very large and complex bodies of computer code and have thousands of loopholes that cause the security system to break down under situations where programs are especially constructed to take advantage of less-tested or unvalidated corner cases in the operation of the security subsystem. Furthermore, the security implementation of modern operating systems does not perform well when all programs are initiated by the same user.

These "security vulnerabilities" are not important for well behaved programs during typical operation, but are used extensively by cyber criminals to subvert the computer's security subsystems. Once the system's security is subverted, it is generally possible for cyber criminals to run any software under their control on the subverted computer system.

The Lack of Isolation problem stems from the fact that a large amount of code executed by computers today comes from sources outside the computer, some of which have explicit intentions of committing criminal activities. This includes any program downloaded from the Internet or any web site visited by the computer. All downloaded programs (good and bad) have the same OS and library services available to them to use during their operation. Consequently, any program (even malware), can exploit any security vulnerability in the complex OS or web browser environment and subvert the security subsystem that isolates applications from one other. For example, when a user visits a web site, he or she is really running web application code developed by the publisher of the web site. If this web site is malicious, then malware may be executed on the computer. Malware may be designed to exploit a security vulnerability in the web browser to take control of the computer system during subsequent web site visits, e.g., if you visit your bank's web site, your key strokes may be captured and your login/password information for the bank may be transmitted to the malware publisher.

Most computer security professionals understand the existence of the Lack of Isolation problem, but consider it hard to solve in any practical way because better achieving the goal of isolation between applications fundamentally tends to conflict with achieving the goal of increasing seamless communication between different local and web applications. There has been some work towards the isolation of web code from different sources being run by a web browser. Modern browsers have attempted to create a level of sandboxing around downloaded web application code in order to isolate downloaded code from the rest of the computer and from each other. However, these models are fairly primitive in their ability to deal with the full gamut of security issues that arise during the course of a typical user's web experience. For example, certain versions of Google's Chrome web browser's sandboxing does not address safety issues arising from downloaded browser plugins and various types of native executables; thus, every computer system running certain versions of Chrome is vulnerable to a zero day exploit attack against Adobe Flash or Microsoft Word as much as if the system was running a less secure or older browser with the same Adobe Flash Plugin or Microsoft Word plugin.

Web browsers have been burdened with the need to ensure full compatibility to older and non-standard web pages in their efforts to provide superior safety and privacy. For example, web browser programmers have had to make some relaxations around the same-origin policy in order to correctly render popular web sites that rely on the sharing of information between web sites.

Last but not least, most web browsers vendors suffer from a huge conflict of interest because their business relies upon monetizing the web browsing habits of their users within their own business processes and with their industry partners. This monetization relies on data about users' browsing habits which is contained in the web cookies that are set and later provided to web servers during the course of web sessions. Companies such as Google and Microsoft have a great interest in learning as much as possible about a person's browsing habits and typically arrange the default privacy settings of web browsers to be advantageous to them (but less than optimal from a security and privacy standpoint). This choice of default privacy and core functionality settings causes web browsers to transfer large amounts of sensitive information from end users' machines to Internet related businesses, such as Google, Microsoft, Apple, etc., thereby allowing such businesses to better monetize their customer base by offering appropriate products and services and serving targeted ads. These same settings, however, can be leveraged by malicious parties to exploit security vulnerabilities. While all web browsers provide some level of control to the sophisticated user to tune his or her web browser functionality and/or privacy/safety settings to browse more securely, the vast majority of users never change these default settings.

Some security researchers have also proposed the use of "client virtualization" (also called "Virtualization using a Hypervisor" in the desktop) to solve the Lack of Isolation Problem. In one form of client virtualization, the user runs multiple independent operating systems on their laptop or desktop on multiple virtual machines (VMs) within the client system which have been created using a hypervisor, such as from VMWare of Palo Alto, Calif. or Virtual PC, available from Microsoft Corporation of Redmond, Wash. When client virtualization is used to achieve improved security, different VMs are used to run applications from different sources or of different types. For example, an OS in one VM may be dedicated for accessing the corporate network that the user may be part of and running corporate applications (local and web). Another OS in a second VM might be used by the user to run his or her personal programs and store personal documents. Finally, a different OS in a third VM may be used for general web browsing on the wider Internet and running native executables that may have been downloaded from the Internet. An example of such a solution is XenClient, which is made by Citrix Systems of Ft Lauderdale, Fla.

The use of classical client virtualization, as discussed above, to solve the general code isolation problem in the context of Internet endpoints suffers from several drawbacks. A first drawback is that there is too much management overhead for the end-user. The end-user has the onus of making the decision as to what VM to use for each activity. Any mistake, intentional or accidental, may subvert the integrity of the system. While many safeguards can be added as a layer on top of the core virtualization technology to prevent the user from making mistakes, this has not yet been demonstrated to work in a practical and robust fashion.

Another drawback is that this arrangement of VMs is very static and does not lend itself to the dynamic and varied nature of the typical user's activities. For example, depending on the time of the day, many users may need to isolate programs from 2 sources to 10s of sources. In the arrangement described above, there is no VM based isolation between all the web sessions of the user on the general Internet. Running 10s of VMs on a single client system all the time leads to too much performance and management overhead using prior approaches. Starting VMs on demand for individual activities suffers from huge latencies to start activities and a limitation on the number of concurrent activities supported, which adversely affects the user experience.

An additional drawback is that client virtualization, as described above, suffers from the problem that any VM that is used for general web browsing is just as vulnerable to a security problem as any monolithic system running a single VM while accessing web sites on the general Internet. Therefore, it is quite likely that the VM dedicated to web browsing described in the arrangement above will be subverted by malware eventually. Any subsequent activities in that VM, then, will be compromised.

Due to these reasons client virtualization has not been used widely to improve the security of Internet endpoints.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for securing an Internet endpoint from being compromised by malicious code executing thereon through the use of fine-grained operating system (OS) virtualization are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention prevent malicious code, introduced into a computer system, from compromising the resources of the computer system through the use of dynamic operating system (OS) micro-virtualization. A computer system of an embodiment includes a number of independent virtual machines (VMs) that each executes a full operating system (OS).

As used herein, the term "virtual machine" refers to an emulation of a computer system. Non-limiting, illustrative examples of a virtual machine include the Intel® SGX environment, virtual containers, and User-Mode Linux (UML).

Figure 1:
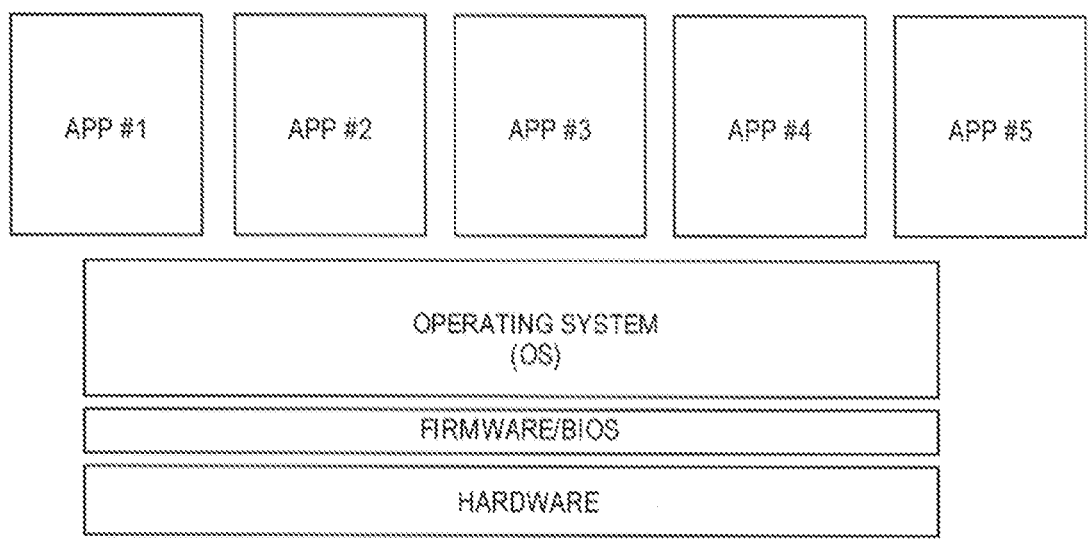
FIG. 1 is an illustration of the layered arrangement of hardware and software present in modern computer systems.
Figure 2:
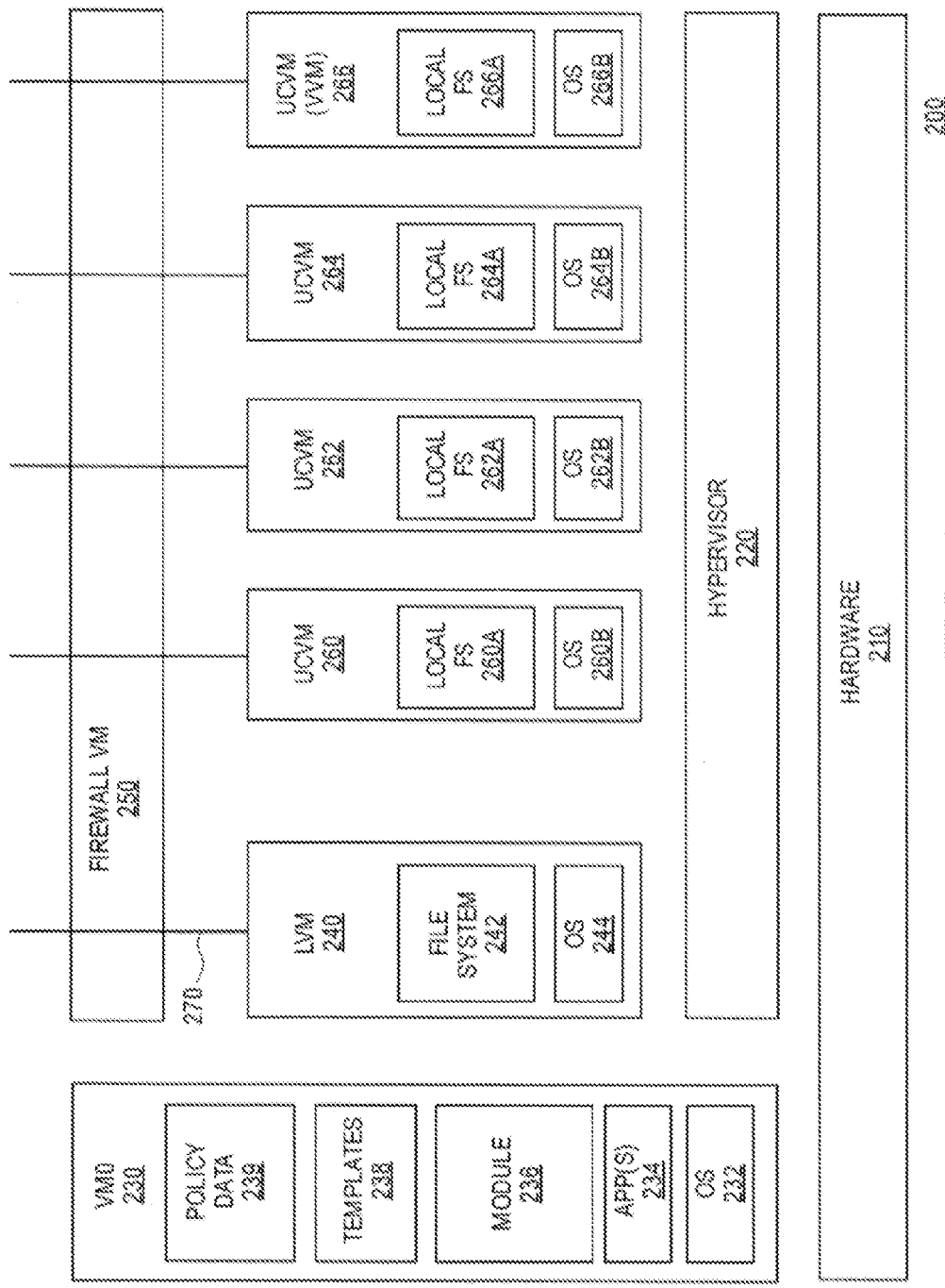
FIG. 2 is an block diagram of the functional components of one embodiment of the invention.

A block diagram of client 200 according to one embodiment of the invention is shown in FIG. 2. The term "client," as broadly used herein, represents any type of Internet endpoint or computer system capable of connecting to a network and executing a virtual machine. Non-limiting, illustrative examples of client 200 include a PC, a laptop computer, a tablet computer, a cell phone, a personal digital assistant (PDA), and the like.

In an embodiment, client 200 may correspond to a server. Thus, while use of the term "client" in other contexts might exclude an interpretation that includes a server, as broadly used herein, client 200 may be embodied on a wide variety of machines, one example of such being a server. Thus, as the Applicant may be his or her own lexicographer, as used herein, the term client 200 expressly includes a server. For example, non-limiting, illustrative examples of client 200 include a web server, an application server, a file server, and a cloud server. Indeed, implementing embodiments of the invention upon a server may yield many benefits. The micro-virtualization techniques employed by embodiments provide an efficient mechanism for eliminating the risk of executing untrusted code and/or interpreting untrusted data in accordance with different policies to manage such risk. As such, a device, such as a server, which interacts with (a) numerous sources of untrusted code and/or data and/or (b) two or more corporate entities having different policies towards managing the risk of untrusted code and/or data, may benefit from embodiments of the invention.

Client 200 includes a number of virtual machines (such as 230, 240, 250, and 260, for example) that execute on hardware 210 of client 200. The various VMs within client 200 may be used for separately executing processes associated with different activities. One such VM, namely "VM0" (i.e., VM0 230 of FIG. 2), is secured so that VM0 may serve as the root of trust with a guaranteed integrity. VM0 may contain core operating system 232 and one or more applications 234. In the embodiment shown in FIG. 2, VM0 is not accessible over any network, such as the Internet. As shall be explained below, VM0 provides a secure environment in which operating system 232 and one or more applications 234 may execute without risk of exposure to malicious code.

Other VMs, such as VMs 260, 262, 264, and 266 in FIG. 2, may be created, maintained, and destroyed on-demand using a very efficient micro-virtualizing hypervisor 220. Using efficient micro-virtualization techniques, the latency of starting and stopping activities or applications which run in their own VM in embodiments is very low, thereby providing a practical user experience while employing full OS virtualization.

Embodiments address and overcome many disadvantages, such as the Lack of Isolation Problem, experienced by modern general purpose computer systems that execute code from different sources and of differing trust levels; nevertheless, embodiments maintain compatibility with current typical real-world usage of computer systems by corporate and non-corporate users. This is so because any activity which is not previously deemed trustworthy is performed in a separate VM by certain embodiments, and so all code which may be potentially malicious is executed in its own VM that is destroyed after its immediate use is ended, thereby preventing any malicious code from effecting any lasting change to a computer system according to an embodiment of the invention.

The Trusted Virtual Machine—VM0

In an embodiment of the invention, a special virtual machine, referred to herein as "VM0," is created to be a trusted and secure portion of a computer system. FIG. 2 depicts VM0 230 according to an embodiment. To achieve the property of being trusted and secure, VM0 230 may be permanently disconnected from any network (i.e., VM0 230 is not connected to any local network or the Internet). Specifically, VM0 230 may not contain any type of networking stack, such as a TCP/IP network stack, and may not have access to any networking hardware that could allow for communication between VM0 230 or any applications 234 executed thereby and the Internet. Thus, to install software onto VM0 230, it is typically required to have physical custody of client 200 and manually install the software onto VM0 230. Note that a client may contain any number of VM0 virtual machines. While FIG. 2 depicts an embodiment comprising a single VM0, other embodiments may comprise two or more VM0s.

Thus, in certain embodiments, one or more applications 234 executing within VM0 230 do not have any access to a network, must be fully self-contained in their functionality, and must rely only on local code and data for all their functionality. All applications that need to access the network will therefore need to run in a separate virtual machine outside of VM0 230, as shall be described in further detail below. It is envisioned that the software (such as one or more applications 234) running in VM0 be selected at the time client 200 is manufactured or first configured for use in a controlled environment. Because VM0 230 is never connected to any type of network, such as a TCP/IP network, all common types of network initiated attacks cannot be waged against VM0 230, thereby rendering VM0 230 immune to such attacks and safe as compared to any computer or VM that is connected to the Internet.

In an embodiment where hypervisor 220 is a Type 2 hypervisor, when client 200 is booted, only VM0 230 is started by the BIOS or firmware of client 200. Once VM0 230 is running, VM0 230 can start hypervisor 220 immediately or on demand. In another embodiment, where hypervisor 220 is a type 1 hypervisor, hypervisor 220 is first started by the BIOS when client 200 is booted and VM0 230 is launched by the Hypervisor 220. Hypervisor 220 is a software component that is responsible for creating other VMs which each execute independent instances of the operating system. These additional VMs are instantiated by VM0 230 and/or hypervisor 220 to run any untrusted code or code that needs to access the network. Untrusted code in this context is any code which has not been pre-approved as being trusted by an IT administrator of client 200. The additional VMs are started "silently" and automatically by client 200, e.g., these VMs are started transparently to the user and without the user having to do anything explicit. These additional VMs are also not explicitly visible to the user; instead, all the user sees on the desktop is familiar objects (such as icons, windows, and applications) without any indication that multiple VMs are executing in client 200. Embodiments of the invention follow rules that govern what application activities are assigned to which particular VM. These rules are described below in greater detail.

In another embodiment (not depicted in FIG. 2), VM0 230 may have a networking stack that is firewalled off from the network using well-tested firewall software, thereby allowing VM0 230 to have access to a computer network. Such an embodiment may only allow connections with a specific Internet system so that the software inside VM0 230 may be updated from a designated update server. For example, the firewall software may only allow VM0 230 to connect to one or more servers associated with the IT administrator of client 200 and may prevent VM0 230 from establishing a connection with any other endpoint on any network.

Interaction with an User Interface

All code responsible for generating a user interface (UI) not associated with an application may be maintained in VM0 230. Consequently, all UI interaction activity with the desktop between a user and software executing on client 200 may take place between the user and VM0 230, which maintains a unified desktop for all applications running in all VMs. Interaction between the user and applications running in VMs other than VM0 230 takes place indirectly via VM0 230. For example, when the user enters a password for a web site whose browser and HTML/Javascript code is running in an untrusted VM, the password is first directly provided to VM0, which then transfers the information to the untrusted VM. Furthermore, the untrusted VM's display is rendered on to a virtualized display, which is then composed into the VM0 desktop (as appropriate) by controlling code running in VM0 230. As code executing in VM0 230 is trusted, the user may trust any user interface controls displayed on a screen since all code responsible for rendering the user interface is trusted.

This approach is quite different from prior systems where often the code that controls the full desktop experience is untrusted. Consequently, if the code responsible for generating the user interface is corrupted by malware, then the user interface may be used as a tool to deceive the user. For example, malware may cause a user interface control to be displayed that requests the user to submit an authentication credential which will be used for improper purposes by the malware. However, this problem is overcome by embodiments of the invention—since all code responsible for rendering user interface controls executes in VM0 in an embodiment, malware is prevented from hijacking or corrupting UI-rendering code.

Figure 7:
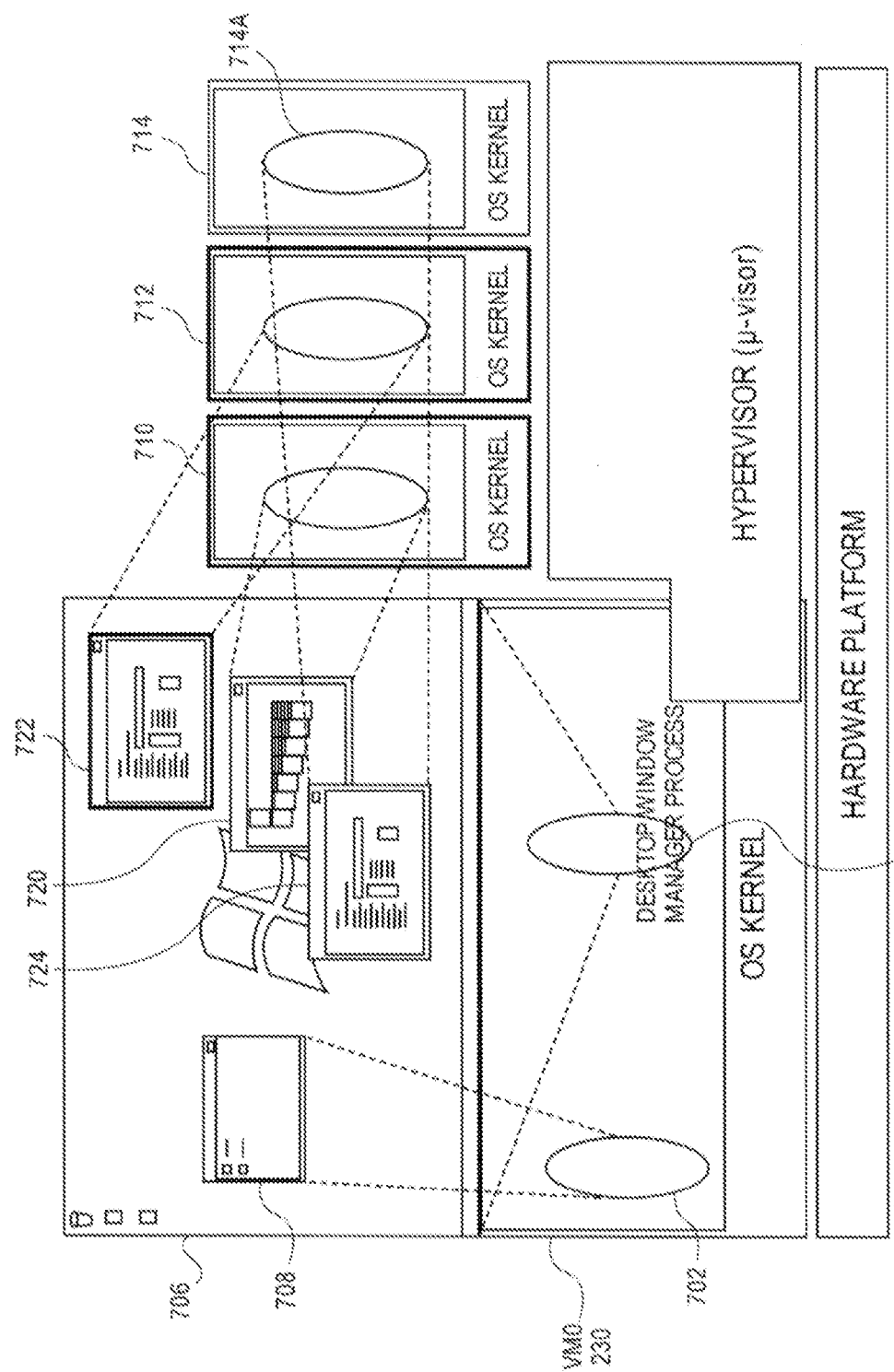
FIG. 7 is an illustration of exemplary desktop of a client according to an embodiment of the invention.

To illustrate an embodiment of the invention, consider FIG. 7, which is an illustration of exemplary desktop of client 200 according to an embodiment. As shown in FIG. 7, process 704 is responsible for rendering desktop 706 on a physical display of client 200. Process 714A runs in untrusted VM 714 and does not have complete access to the file system of client 200. When any process inside VM 714 requests access to the file system of client 200, it is intercepted and process 702 is responsible for rendering a window 708 depicting the contents of the file system of client 200. Process 702 has the option of selectively displaying which contents are available to the VM 714 based on policies as set forth by the IT administrator or the user. VM 710 in FIG. 7 that runs the solitaire game is implemented such that the display of VM 710 is a virtualized display, which is then composed into the desktop 706 (as appropriate) by controlling process 704 running in VM0 230. The displays of VMs 712 and 714 are rendered on the desktop 706 in a similar fashion.

The Legacy Virtual Machine—LVM

FIG. 2 depicts a legacy virtual machine (LVM) 240 according to an embodiment of the invention. LVM 240 may contain operating system 244. LVM 240 serves as the primary entity being managed by the IT administrator of client 200. As such, LVM 240 provides an environment that is analogous to the managed enterprise OS of corporate computer system in that an IT department may install and maintain various enterprise applications within operating system 244 of LVM 240. In an embodiment, operating system 244 of LVM 240 may correspond to a Microsoft Windows OS or any other general purpose OS such as Linux or MacOS.

In an embodiment, LVM 240 is responsible for storing the main file system 242 of client 200. File system 242 may contain the user's profile folder containing the user's settings and files.

LVM 240 typically only runs infrastructure OS programs and programs that are used for the purpose of managing client 200 and trusted enterprise applications. Other user programs (especially those that involve external components or consume untrusted data) do not run in LVM 240, but instead, run elsewhere in separate VMs (such as a UCVM as described in more detail below).

In an embodiment, the network access of LVM 240 is restricted to just the corporate network as implemented by firewall VM 250. Firewall VM 250 is a specialized virtual machine that comprises firewall software/applications to restrict network access of VMs running in client 200 to appropriate and/or necessary network access points. Such practice is consistent with the need for only the responsible IT administrator to be capable of connecting to LVM 240 to manage LVM 240 and processes executing therein.

In one embodiment, LVM 240 and VM0 230 may be implemented in a single virtual machine.

Untrusted Code Virtual Machine—UCVM

When a user wishes to run any application that requires access to either a network or untrusted data (untrusted data is any data that originates from outside client 200), the application is run inside a dedicated VM that is created on-demand by hypervisor 220. This dedicated VM is called an Untrusted Code Virtual Machine (or UCVM). FIG. 2 depicts several UCVMs, namely UCVM 260, 262, 264, and 266. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of LVM 240, or a stripped-down version of LVM 240, in memory and (b) providing access to a restricted file system to the newly created UCVM. For example, UCVM 260 comprises restricted file system 260A, UCVM 262 comprises restricted file system 262A, and UCVM 264 comprises restricted file system 264A. Each UCVM possesses its own instance or copy of the operating system, which is isolated and separate from the main operating system (including its code and data) executing within VM0 230 or LVM 240. For example, UCVM 260 comprises operating system 260B, UCVM 262 comprises operating system 262B, and UCVM 264 comprises operating system 264B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 238 stored in VM0 230. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Module 236 is software that is responsible for implementing the rules and policies of embodiments as well as helping the user of client 200 in understanding and navigating the security model employed by client 200 on an as-needed basis. Module 236 helps decide what activities run in which UCVMs, including when VMs are created or destroyed, and what kind of access to network and file system resources each UCVM has. Module 236 also helps protect the user, e.g., when a user is fooled by malware running in a UCVM and is in the process of providing some information that they have previously provided to enterprise code running in LVM 240 (for example a password), then module 236 may detect this situation and prevent the user from providing the information (which may be secret corporate information) to the malware.

Regarding the restricted file system of each UCVM, each UCVM has access to a private copy of a subset of the files in file system 242 on client 200. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 260 as an example, if a process executing within UCVM 260 makes any changes to any files in restricted file system 260A, then these changes do not impact the files stored in file system 242 maintained in LVM 240 because such changes are only made to restricted file system 260A maintained in the UCVM and are not propagated, without express consent from the user, to file system 242 maintained by LVM 240.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse affects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, module 236 of VM0 230 may dynamically create the UCVM using a template in one or more templates 238 or use a pre-existing template in memory or on the disk. The template selected by module 236 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab is open at a different web page. In consideration of the code which may be contained or embedded on a web page, each web page may be properly considered a web application. In embodiments of the invention, the code responsible for rendering the user interface (UI) of the web browser runs in VM0 230. On the other hand, executable code for the three web applications runs in three separate UCVMs. A core HTML/Javascript engine runs in each of the three UCVMs. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which client 200 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for client 200.

Firewall Virtual Machine

In an embodiment, the implementation of the network access restrictions is done in a dedicated VM called a firewall VM. FIG. 2 depicts an exemplary firewall VM 250 of an embodiment. Firewall VM 250 runs an isolated operating system with a dedicated and fixed set of firewall applications that implement the network access policy for all VMs in client 200 (except perhaps VM0, which may not have any network access). Firewall VM 250 may provide, to any virtual machine running on client 200 in which untrusted code is executed or untrusted data is being interpreted, restricted access to only those network resources deemed necessary on an as-needed basis in accordance with a policy described by policy data stored on client 200.

In another embodiment of the invention, the firewall functionality of the system may be co-located and implemented inside either the hypervisor 220 of FIG. 2, or inside the LVM 240 of FIG. 2 (working in conjunction with the hypervisor 220 of FIG. 2), or inside VM0 230 of FIG. 2 (working in conjunction with the hypervisor 220 of FIG. 2).

Validated Virtual Machines—VVMS

UCVMs are not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 2 depicts an exemplary VVM 266 of an embodiment. Note that while FIG. 2 depicts a single VVM for ease of explanation, other embodiments of the invention may employ two or more VVMs or no VVMs based upon the particular needs of the user and/or policies of the organization responsible for or the owner of client 200.

Applications need to be signed and configured for co-location in the same VM by an administrator of client 200 before they can run in VVM 266. Inside VVM 266, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 242 exposed to a VVM is similar to that exposed to a generic UCVM in that the restricted copy of file system 242 exposed to a VVM comprises only those files related to, or required for, performance of the applications executing within the VVM.

The Restricted File System Exposed to a VM

Figure 3:
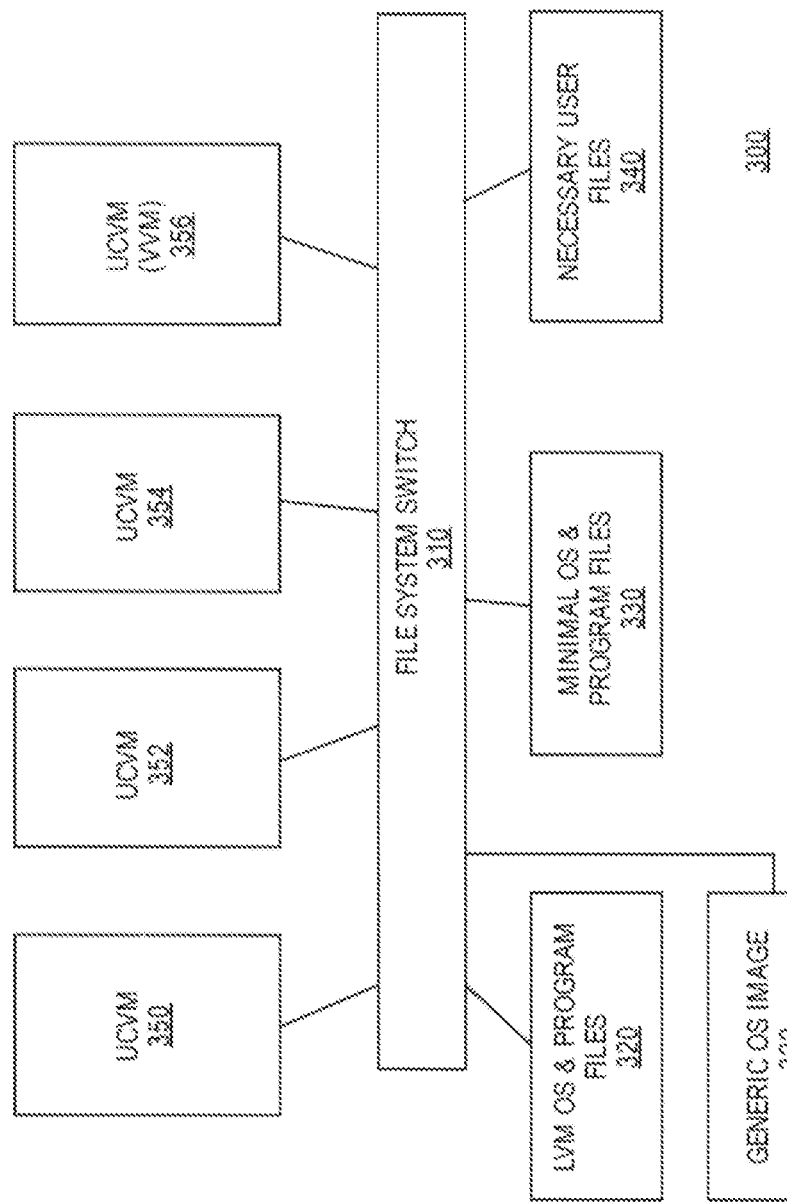
FIG. 3 is block diagram of the functional components involved in exposing a restricted copy of the file system to different UCVMs (and VVMs) according to an embodiment of the invention.

FIG. 3 is block diagram of the functional components involved in exposing a restricted copy of file system 242 to different UCVMs (and VVMs) according to an embodiment of the invention. File System Switch 310 is software that is configured to provide the newly created UCVM with access to a copy-on-write clone of the OS image that the UCVM was created from once the UCVM has started. The minimal operating system and program files 330 in the copy-on-write clone may be created from either the corporate LVM OS image 320 or a separate generic, stripped down OS image 322 which may be created by the IT administrator.

Furthermore, a newly created UCVM is provided a copy of necessary user files 340, which are a subset of the user files in file system 242. The composition of necessary user files 340 will be different for each user. The set of files comprising the user files in file system 242 maintained in LVM 240 are typically those files in the user's home folder, e.g., c:\Users\<username>. The particular copies of files that are provided to a particular UCVM as necessary user files 340 are the minimum set of files that are needed by that UCVM to accomplish what the user intended to do as captured when the target application was being invoked. For example, if the user double clicked on a specific MS Word file named ABC.docx at the location c:\Users\<username>\Documents in the file system 240 maintained in LVM 240, then necessary user files 340 would only include a copy-on-write clone of the ABC-.docx file and only this copy-on-write clone of the ABC.docx file is made available in the virtual c:\Users\<username>\Documents folder made visible to the newly created UCVM running the MS Word application. If a program (like MS Word) was started without any association with a file, then necessary user files 340 would correspond to an empty c:\Users\<username>\Documents virtual folder.

Any application running in a UCVM therefore only has access to the particular set of user files provided explicitly by the user when the program was invoked. Subsequently, if the user wants to browse file system 242 for another file from within the application (for example, by using the File->Open menu item of MS Word), then he or she will see a restricted user files directory.

Figure 4:
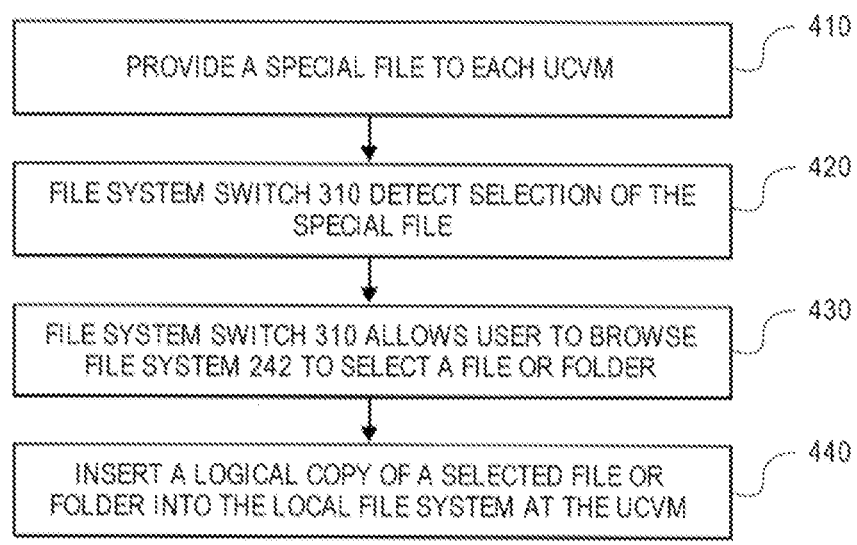
FIG. 4 is a flowchart illustrating the steps involved in a UCVM obtaining a copy of a new user file maintained in the file system stored elsewhere according to an embodiment of the invention.

To enable the user to select files from the user's own User Files folder in file system 242 maintained in LVM 240 using an application executing within an UCVM, a user interface may be provided to allow the user to browse his or her files in file system 242, select one or more of the user files, and expose a copy of the selected files to the appropriate UCVM. For example, FIG. 4 is a flowchart illustrating the steps involved in a UCVM obtaining a copy of a new user file maintained in file system 242 according to an embodiment of the invention. In step 410, a special file is provided to each UCVM. The special file may be provided to the UCVM in a number of different ways, e.g., the special file may be inserted into each folder of the virtual C:\Users\<username>directory provided to each UCVM. This special file may be named something akin to "Show All My Files" or the like, as its selection will be used to trigger exposing additional copy-on-write clones of files stored in file system 242 to the UCVM.

In step 420, File System Switch 310 detects when the special file is selected by the user. For example, when a program executing within a UCVM browses to the special file, presumably as a result of a user click, this action may be trapped by File System Switch 310.

In step 430, File System Switch 310 invokes a dialog with LVM 240 that allows the user to browse the full file system 242 maintained in LVM 240. The user may then select a file or folder in file system 242. Note that at this stage, the user may be granted read access to the full file system 242 for purposes of selecting a file or folder, but the user is not granted write access to file system 242. Therefore, the user is prevented from modifying file system 242 maintained by LVM 240 in any way.

In step 440, after the user selects a file or folder, a copy of the selected file or folder is created. The copy of the selected file or folder is then inserted into the restricted file system associated with the UCVM. As a result of inserting the copy of the selected file or folder in the restricted file system associated with the UCVM, an application executing in the UCVM may have read and write access to the copy of the selected file or folder in the virtual file system, but is prevented from effecting any change to the original copy of the selected file or folder in file system 242 maintained by LVM 240.

The steps of FIG. 4 ensure that files in file system 242 maintained by LVM 240 are not visible to a UCVM without explicit permission from the user. Malicious code running in a UCVM, for example, cannot programmatically access files in file system 242 in LVM 240. Further, malicious code running in a UCVM also cannot render a false user interface to trick the user into unintentionally providing any user files to the malicious code, since all code responsible for rendering the user interface is maintained within VM0 230, and thus, unreachable and un-hackable by the malicious code.

File System Switch 310 may be implemented in a variety of ways. For example, in one embodiment, File System Switch 310 may be implemented by a network file system protocol (NFS or CIFS may be used). A special VM (or LVM 240) may be used as the OS serving the "User Files" shared file system. Other VMs "mount" this shared file system using NFS or CIFS (or another network file system) from the hosting VM. Application software in the hosting VM may decide what files are exposed to which VM based on instructions provided by VM0 230.

In another embodiment, File System Switch 310 may be implemented, in part, by a proprietary protocol for handling communications between the different UCVMs and File System Switch 310. File System Switch 310, in such an embodiment, may be implemented as part of a special VM or in LVM 240.

Cloning a UCVM from a Template

In an embodiment of the invention, every virtual machine created in client 220 is instantiated using one or more templates selected from one or more templates 238 stored in VM0 230. In an embodiment, each template in one or more templates is either immutable or may be updated in a very controlled fashion. For example, in an embodiment where a template may be updated in a controlled fashion, a template may be updated or customized based on the behavior of an application executing in the virtual machine instantiated using the template.

Each of one or more templates 238 may be used to instantiate or create a virtual machine with different characteristics or operational parameters. The characteristics or operational parameters described by a template may be configured, tailored, or suited for a particular context or type of processing activity. For example, each template may specify what resources of client 200 can access, what type of code is to be run within a virtual machine created using the template, a size of the virtual machine created using the template, firewall settings for the virtual machine created using the template, what type of virtual machine (for example, a VVM, UCVM, or a LVM) is the be created using the template, how changes to a local file system within the virtual machine created using the template are to be persisted, and what portion, if any, of the network a virtual machine created using the template may access.

In this way, a template may be used to determine what hardware resources and/or software resources of client 200 should be exposed or made available to a virtual machine instantiated using the template, e.g., the template may specify whether a virtual machine may have access to a network interface card (NIC) of client 200 or may specify how much memory of client 200 is available to the virtual machine instantiated using the template. As another example, a template may be used to determine what network resources should be exposed or made available to a virtual machine instantiated using the template. In this way, the template may be used to manage how much access a virtual machine has to the Internet or an internal network (such as an Intranet).

One or more devices internal to client 200 or externally connected to client 200 may interact with one or more processes executing in a virtual machine within client 200. In an embodiment, a template may assign responsibility for a selected set of devices to a virtual machine created using the template. In other embodiments, responsibility for a selected set of devices may be assigned to a particular virtual machine by virtue of policy data stored on client 200. Such policy data may describe one or more policies provided to client 200 from an owner or responsible organization of client 200. Policy data of this nature may be maintained by VM0 230 or LVM 240, for example, in certain embodiments.

In an embodiment, one or more templates 238 may be arranged in a hierarchy such that there is a root node corresponding to a template having a default set of characteristics. The root node may have one or more child nodes, and each of these child nodes may be associated with a template that inherits the properties of the parent template, but contains additional or changes properties associated with that child node. Naturally, each child node may also have children, and so the hierarchy of templates may be an arbitrary number of levels deep, where each template inheriting characteristics of its parent, but yet each template is capable of further defining or changing characteristics that distinguishes the template over its parent.

Branches of the hierarchy of templates may be associated with, or more particularly suited, different types of activity. For example, certain templates may be associated with corporate activity, and may therefore specify characteristics related to virtual machines running corporate applications. Similarly, certain templates may be associated with the user's personal application's activity or Internet/Web related activity, and may therefore specify characteristics related to virtual machines running the user's own applications or Internet/Web applications respectively.

Figure 5:
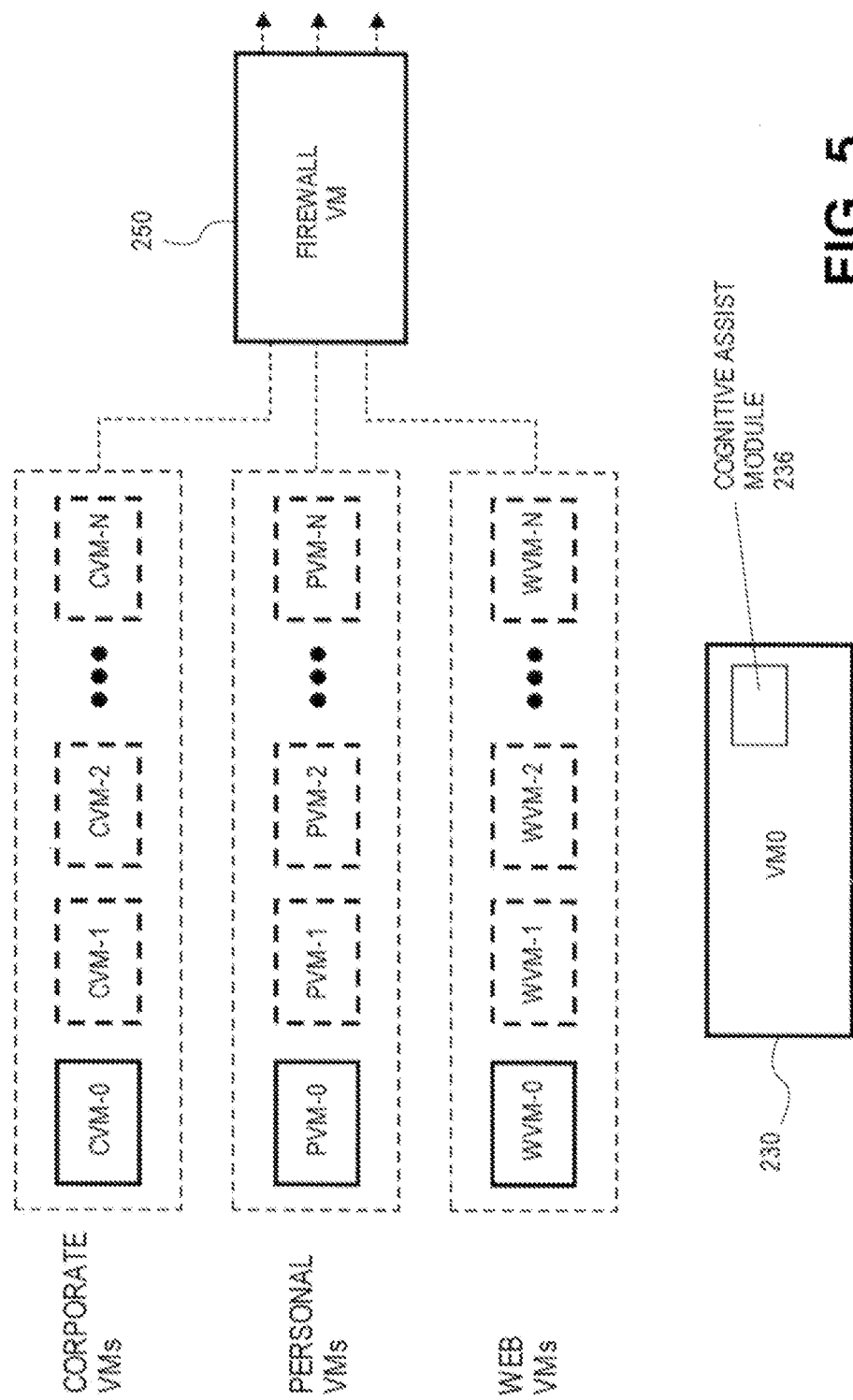
FIG. 5 is an illustration of instantiating a plurality of different virtual machines using different templates according to an embodiment of the invention.

FIG. 5 is an illustration of instantiating a plurality of different virtual machines using different templates according to an embodiment of the invention. In FIG. 5, CVM-0 represents a template that defines a virtual machine having characteristics suitable for running a corporate application, PVM-0 represents a template that defines a virtual machine having characteristics suitable for running a user application (non-corporate), and WVM-0 represents a template that defines a virtual machine having characteristics suitable for running an Internet application. Other embodiments of the invention may define a variety of other templates to define different types of templates. In the example of FIG. 5, module 236 in VM0 230 may use CVM-0 to instantiate one or more corporate virtual machines, such as CVM-1, CVM-2, etc. Similarly, module 236 may use PVM-0 to instantiate one or more personal (non-corporate) virtual machines, such as PVM-1, PVM-2, etc., and module 236 may use WVM-0 to instantiate one or more web-based virtual machines, such as WVM-1, WVM-2, etc. As depicted in FIG. 5, each instantiated UCVM connects to an external network through Firewall VM 250. Module 236 can either create these templates on demand or create and store them while monitoring the usage of the client.

The particular set of one or more templates 238 used in instantiating a particular virtual machine may be identified based on a policy that considers a number of factors. For example, as explained above, one such factor is the type of activity being requested to be performed. Another factor which may be used in identifying which of the one or more templates 238 to use in instantiating a particular machine is the provenance of the executable code whose execution is being requested. If the software whose execution is being requested has always resides in a trusted environment, then the policy might allow such software to be executed in a virtual machine having greater access to resources than software originating from an untrusted environment (such as the Internet), under the rationale that there is a greater possibility than software originating from an untrusted environment may contain malicious code therein, and thus, care should be exercised from exposed network resources or resources of client 200 to such potentially malicious code.

Another factor which may be used in identifying which of the one or more templates 238 to use in instantiating a particular machine is the user input accompanying the request. If user input accompanying indicates that a user, rather than a potentially malicious process unbeknownst to the user, if requesting the execution of executable code, then the policy may provide greater access to network resources or resources of client 200 to the virtual machine in which such executable code is run.

The reputation of the application or software whose execution is being requested may also be considered in identifying the one or more templates 238 to use in instantiating the virtual machine. If executable code is recognized as having a good reputation, then the virtual machine in which it executes may be granted greater access to resources, either of the client 200 or of a network, by the policy consulting in identifying a template 238.

In an embodiment, the behavior of an application executing in a virtual machine may be monitored and observed. Based on the observed behavior of the application, the policy consulted in identifying one or more templates 238 for use in instantiating a virtual machine may be updated or customized. In this way, if the characteristics of the virtual machine in which the application executes allow the application to behave in an unexpected or undesirable manner, the policy may be updated to prevent such behavior in the future. Similarly, after observing the behavior of the application during execution, a template 238 may be updated to reflect the observed behavior of the application. This allows templates 238 to be continuously customized and updated during the operation of system 200. Templates updated or customized during operation of system 200 may be shared or provided to other clients so that the other clients have the benefit of the updated or customized templates.

Installation of Software

In the normal operation of a typical PC, a fair amount of after-market software is installed. Such after-market software installed on a PC generally falls into one of two categories, namely (a) validated software (packages or straight executables) installed by the IT administrator of the PC or (b) end-user installed software (including web browser plugins & extensions, more complex software packages that go through an explicit install phase, and straight executables that can be executed without an explicit installation phase). Note that end-user installed software may be signed (by a verifiable, known vendor) or unsigned.

In embodiments of the invention, installation of validated software is performed as is normally performed today. The IT administrator can manage corporate validated software using embodiments using similar procedures as performed today, except that such corporate validated software are installed in LVM 240 (or if need be, VVM 266).

With respect to end-user installed software, IT administrators have two choices for how they would like to handle this type of installation using embodiments of the invention. The first choice is for the IT administrator to lock down client 200 by disallowing any installation of end-user installed software. While this is a safer operating decision, this approach may reduce the end-user's productivity because the end user cannot take advantage of applications that may be otherwise useful that have not yet been validated by the IT administrator. The IT administrator may provide installation support on an individual and as-needed basis whenever a user wishes to install any end-user installed software; however, doing so will increase the cost of support by the IT administrator.

The second choice is for the IT administrator to allow the user to install end-user installed software him or herself using features provided by embodiments of the invention. End-user installed software may include browser plugins, browser extensions, signed and unsigned installation packages, and straight executables. Browser plugins are installed into an installed browser plugin database that is maintained in a particular UCVM. The installed browser plugin database may be implemented, in an embodiment, using file and registry diff store 820 shown in FIG. 8, which is an illustration of safely installing an untrusted application according to an embodiment of the invention of the invention. During installation of a plugin, the installed browser plugin database is also updated to record the domain that was used to initiate the plugin install. Presumably, this is the web page that contains an element or component that requires the plugin to render the complete content in the web page. Subsequently, the web browser loads an installed plugin into a web HTML/JS engine instance (which runs inside a UCVM) only if the domain of the web page to be displayed by the UCVM matches a domain, recorded in the plugin database, associated with the installed plugin. A plugin that is used by multiple sites is installed only once, but is associated with multiple domains. Popular plugins like Flash may be pre-installed in certain embodiments.

Browser extensions may be installed into a web browser's extension database that is maintained in a particular UCVM. During runtime, browser extensions are treated like web applications in that each browser extension is run inside its own UCVM. In an embodiment, the web browser extension database and the installed browser plugin database may be implemented in the same database in a single UCVM.

Signed installation packages may be run and the resulting installation may update either the LVM image or the Generic Windows image based on a policy set by the IT administrator.

Figure 8:
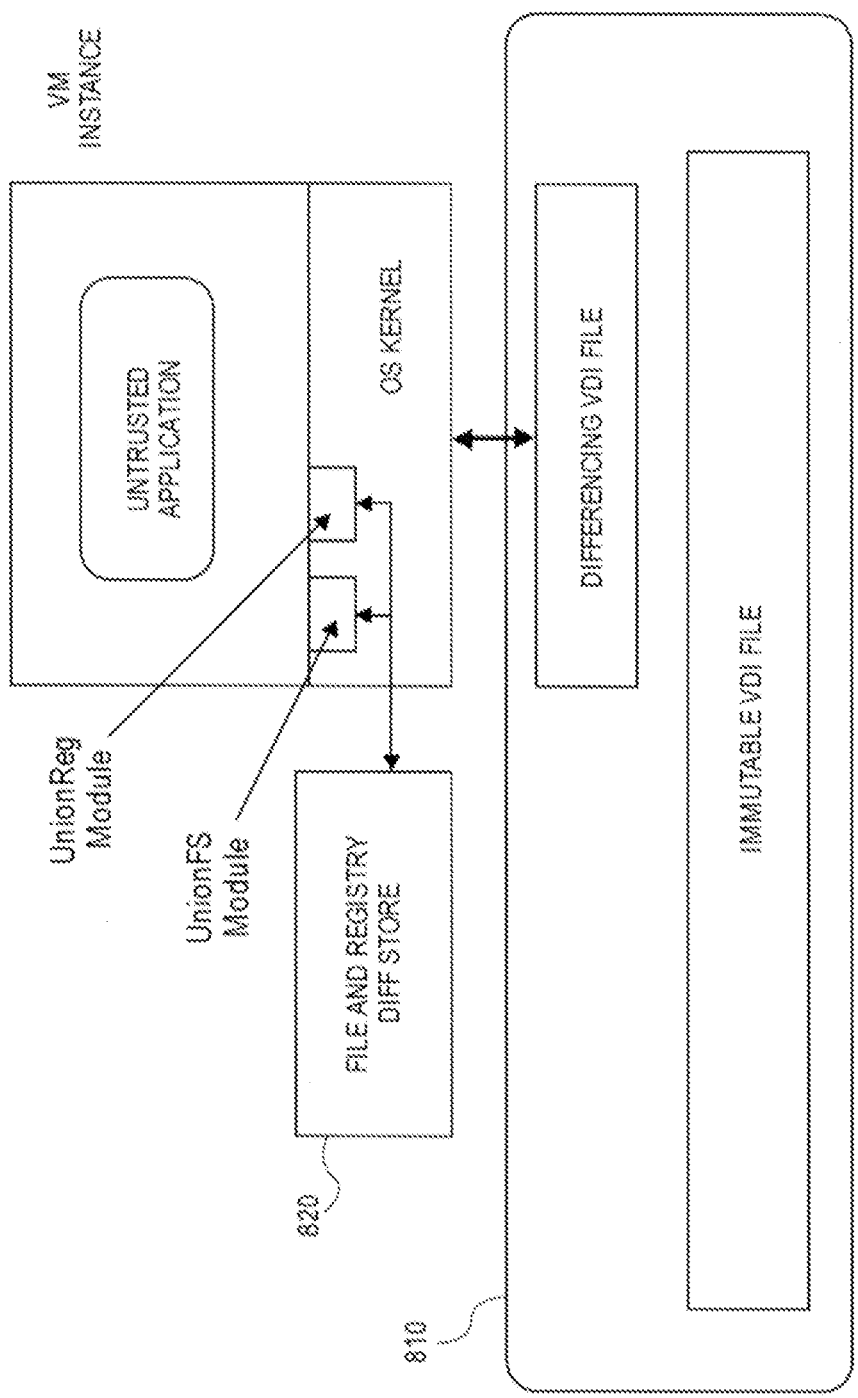
FIG. 8 is an illustration of safely installing an untrusted application according to an embodiment of the invention of the invention.

Unsigned installation packages go through a virtual install. The virtual installation of unsigned installation packages will be described with reference to FIG. 8, which is an illustration of safely installing an untrusted application according to an embodiment of the invention. A registry and program files change set is created and stored in file and registry diff store 820. Start-menu and desktop changes by the installer are captured in a special folder which contains desktop and start menu items for all user-installed applications. Subsequently, if an unsigned application is run, it is run in a UCVM cloned from the Generic Windows image all by itself. Virtual disk 810 in FIG. 8 is the normal virtual disk of the UCVM. DiffStore 820, which further virtualizes the file system and the registry as seen by the applications of UCVM, is typically implemented as a separate module outside of the normal block level virtual disk store.

Signed and unsigned executables may be run in a UCVM. Such a UCVM may be created on demand and destroyed after its use is ended by embodiments.

Managing Web Cookies and Caches

A web cookie (or simply "cookie") is a piece of text stored on a user's computer by their web browser. A cookie can be used for authentication, storing web site preferences, shopping cart contents, the identifier for a server-based session, or anything else that can be accomplished through storing text data.

While the actual cookie itself is not visible to the user, the user would notice a difference in the user experience of interacting with a web site if cookies could not be saved between visits to the web site. Accordingly, embodiments of the invention provide mechanism to store cookies before a UCVM is destroyed, so that the next time the user visits the web site using a web browser running in a different UCVM, any cookies that have been stored and are associated with that web site may be injected into the new UCVM.

Similarly, to provide the best user experience, it would be advantageous to carry over the cache of a web browser for a particular web domain from one UCVM to the next, so that the next time the user visits the web domain using a different UCVM, there is no a delay in displaying content due to an unpopulated cache. Thus, embodiments of the invention provide mechanism to store the web cache of a web browser for a web domain before a UCVM is destroyed, so that the next time the user visits the web site using a web browser running in a different UCVM, the cache of the web browser need not be warmed (i.e., repopulated), as the cache in the new UCVM has been updated to contain all the objects the cache previously contained in the prior, and now destroyed, UCVM used to visit the web domain.

To provide a concrete example with reference to the example of FIG. 2, assume that a user initially transparently uses UCVM 260 to run a web browser to visit web site A. When UCVM 260 is destroyed, any cookies and cache files are extracted and saved. Thereafter, assume the user transparently uses UCVM 262 to run a web browser to visit web site B. As web site B is hosted by a different web domain than web site A, the previously stored cookies and cache files associated with web site A will not be injected into UCVM 262. Thereafter, if UCVM 262 is destroyed, then any cookies and cache files are extracted and saved. At a later point in time, if the user thereafter transparently uses UCVM 264 to run a web browser to visit web site A, then the previously stored cookies and cache files associated with the web domain of web site A will be injected into UCVM 264. This allows the web browser running in UCVM 264 to visit web site A to appear, to the user, to have the same state of the prior web browser used to visit web site A, even through different virtual machines are used between visits. Note that no portions of the file system are saved between visits to a web site; only the state of the web session is saved.

In one embodiment, the cookies and cache information is captured in Diff Store 820 associated with the URL of the website. In each visit to the same URL, the UCVM utilizes the same Diff Store presenting the cookies and caches to the UCVM. In another embodiment, the cookies and cache files can be captured at the end of the session and saved to the client system's core file system in a special folder. On visiting the same URL again, the cookies and cache can be re-injected into the file system of the UCVM.

Efficient Physical-to-Virtual Disk Conversion

Platform virtualization is performed on a given hardware platform by host software (a control program), which creates a simulated computer environment, a virtual machine, for its guest software. A hypervisor, also called virtual machine manager (VMM), is one of many hardware virtualization techniques that allow multiple operating systems, termed guests, to run concurrently on a host computer. The hypervisor presents to the guest operating systems a virtual operating platform and manages the execution of the guest operating systems. A guest OS executes as if it was running directly on the physical hardware. Access to physical system resources such as the network access, display, keyboard, and disk storage is suitably virtualized so that guest OS does not know these are virtual devices.

Generally, there are two types of hypervisors. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows. Embodiments of the invention may use any type of hypervisor. Thus, hypervisor 220 in FIG. 2 may either be a Type 1 or a Type 2 hypervisor.

A virtual disk image is a file on a physical disk, which has a well-defined (published or proprietary) format and is interpreted by a hypervisor as a hard disk. In terms of naming, a virtual disk image may have a specific file type extension, e.g., .vmdk for VMware VMDK, .vhd for Xen and Microsoft Hyper-V, and .vdi for Oracle VM VirtualBox.

There are two approaches employed for storage allocation by prior hypervisors, namely, (1) pre-allocate the entire storage for the virtual disk upon creation and (2) dynamically grow the storage on demand. In the former approach involving pre-allocation, the virtual disk may be implemented as either split over a collection of flat files (typically one is 2 GB in size) or as a single, large monolithic flat file. In the latter approach involving on-demand growth, the virtual disk may also be implemented using split or monolithic files, except that storage is allocated on demand.

There are two modes in which a disk can be mapped for use by a virtual machine. In a virtual mode, the mapped disk is presented as if it is a logical volume, or a virtual disk file, to the guest operating system and its real hardware characteristics are hidden. In a physical mode, also called the pass through mode, the hypervisor bypasses the I/O virtualization layer and passes all I/O commands directly to the disk.

A virtual machine (VM) is a software implementation of a machine (i.e. a computer) that executes programs like a physical machine. Virtual machines allow the sharing of the underlying physical machine resources between different virtual machines, each running its own operating system. The software layer providing the virtualization is called a hypervisor, such as hypervisor 220 in FIG. 2.

Virtual machines each require their own image of the operating system. The guest OS and host OS typically do not share the OS image, even if they are the same OS. This is problematic for several reasons. First, if a user wishes to run 10 different virtual machines, then she will require 10 different copies of the OS for the guest OSs, which requires an undesirable amount of storage to maintain. As she is already running one virtual machine at the host, the total number of different copies of the OS required would be 11. Second, the OS for a VM has to be created either by installing a new OS or shipping a copy of the OS from somewhere else, which is burdensome for those who do not have access to OS images. Further, it is also time consuming to install a new OS or ship an OS image, which is typically quite large. A third problem is that any software present in the host OS (such as a printer driver) will not be available in a guest OS unless it is installed again.

Shadow Copy (Volume Snapshot Service or Volume Shadow Copy Service or VSS) is a technology included in Microsoft Windows that allows taking manual or automatic backup copies or snapshots of data (termed "shadow copies"), even if it has a lock, on a specific volume at a specific point in time over regular intervals. VSS operates at the block level of the file system. Shadow Copy is implemented as a Windows service called the Volume Shadow Copy service. Software VSS provider service is also included as part of the Microsoft Windows OS to be used by Windows applications. Shadow Copy technology requires that the file system to be NTFS to be able to create and store shadow copies. Shadow Copies can be created on local and external (removable or network) volumes by any Windows component that uses this technology, such as when creating a scheduled Windows Backup or automatic System Restore point.

Snapshots have two primary purposes. First, they allow the creation of consistent backups of a volume, ensuring that the contents cannot change while the backup is being made. Second, they avoid problems with file locking By creating a read-only copy of the volume, backup programs are able to access every file without interfering with other programs writing to those same files. Through the integration between the Volume Shadow Copy Service, hardware or software VSS providers, application level writers and backup applications, VSS enables integral backups that are point in time and application level consistent without the backup tool having knowledge about the internals of each application. The end result is similar to a versioning file system, allowing any file to be retrieved as it existed at the time any of the snapshots was made. Unlike a true versioning file system, however, users cannot trigger the creation of new versions of an individual file, only the entire volume.

Figure 6:
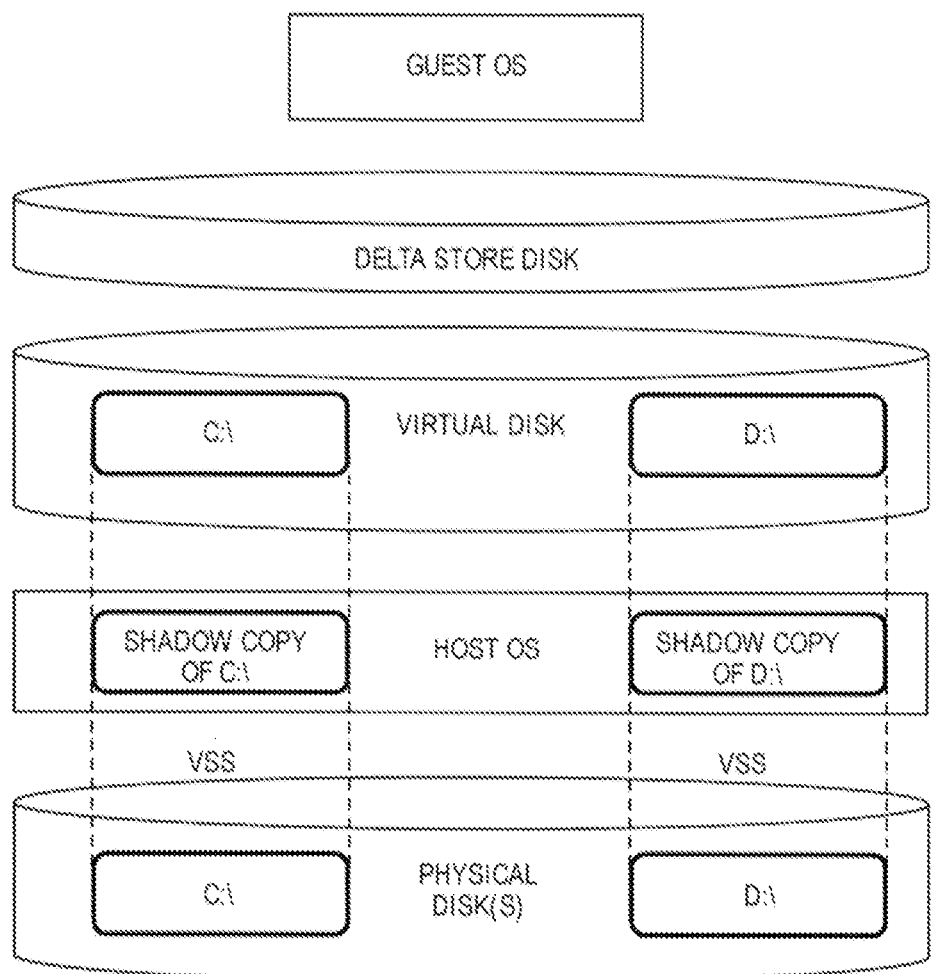
FIG. 6 is an illustration of a virtual disk based on VSS shadow copies according to an embodiment of the invention.

Embodiments of the invention overcome this limitation by creating virtual disks based on VSS shadow copies. FIG. 6 is an illustration of a virtual disk based on VSS shadow copies according to an embodiment. The virtual disk of FIG. 6 allows for many guest OSs running on the same host to share the same OS copy with the host OS. VSS shadow copies may be created fast and efficiently. Creating virtual disks on top of VSS is also a very fast operation, which means that VMs (with same OS as host OS) can be created very efficiently. Shadow copies are also maintained cheaply by windows OS by keeping the changes since the time shadow was created. Hence, the disk usage of multiple VMs is reduced substantially. VMs can also be maintained very efficiently since VSS snapshots can be updated once and have the changes reflected in all VMs. Since a VSS shadow copy contains all the software the user has installed on the machine at the time of the VSS shadow copy creation, virtual disks also receive access to all the software. Moreover, the version of the software, including any patches installed, is exactly the same. In addition to all the software, user documents are also visible to virtual machines. A virtual disk of an embodiment is an accurate point-in-time copy of host physical disk.

In an embodiment where VSS snapshots are read-only, a 'Delta Store Disk' may be attached to the virtual disk. The Delta Store disk is used to capture all the changes being made to the virtual disk.

Security Afforded by Embodiments

Embodiments of the invention provide a secure environment to prevent malicious code from affecting any lasting change in a computer system. Arbitrary code (either a web application or a native executable) runs inside an isolated operating system running on an isolated virtual machine. This code has no access to any other application (either a native application or a web application) being run by the user because those applications run in other operating systems running in separate virtual machines. Moreover, arbitrary code has access to only the specific part of the file system that is needed for correct execution of the code. Access to additional parts of the file system has to be provided by code that runs in VM0 (which is secure and fortified against unauthorized intrusion) and any increased access needs explicit authorization from the human user.

Specific trusted code that needs to interact in a complex way with other applications may be explicitly designated to run together inside the same designated VM. This type of VM also has limited access to the file system.

All code has limited network access to just what that code needs for its correct execution. All virtual machines are created from templates stored in VM0 which are either immutable or can be updated in a very controlled fashion. Consequently, if a security bug exists in a piece of code, the effect of the security bug is isolated ("space limited") because the compromised code has access to only a limited part of the file system, the network, devices, etc. Moreover, the effect of the security bug is "time limited" because the virtual machine that has been compromised will be subsequently discarded and a new virtual machine is created for future application instances from a clean immutable VM template.

Hardware Mechanisms

Figure 9:
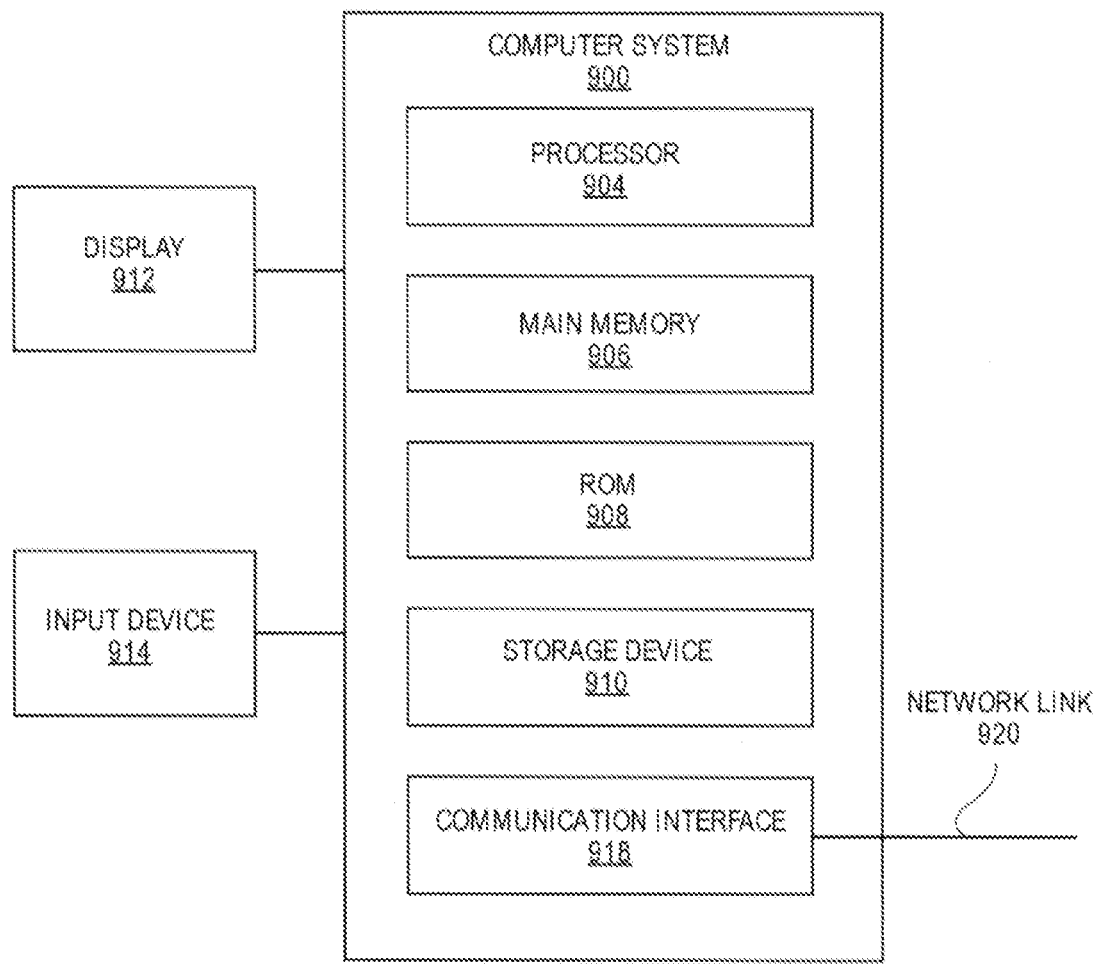
FIG. 9 is a block diagram that illustrates a computer system upon which an embodiment of the invention may be implemented.

In an embodiment, client 200 of FIG. 2 may be implemented on, include, or correspond to a computer system. FIG. 9 is a block diagram that illustrates a computer system 900 upon which an embodiment of the invention may be implemented. In an embodiment, computer system 900 includes processor 904, main memory 906, ROM 908, storage device 910, and communication interface 918. Computer system 900 includes at least one processor 904 for processing information. Computer system 900 also includes a main memory 906, such as a random access memory (RAM) or other dynamic storage device, for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device for storing static information and instructions for processor 904. A storage device 910, such as a magnetic disk or optical disk, is provided for storing information and instructions.

Computer system 900 may be coupled to a display 912, such as a cathode ray tube (CRT), a LCD monitor, and a television set, for displaying information to a user. An input device 914, including alphanumeric and other keys, is coupled to computer system 900 for communicating information and command selections to processor 904. Other non-limiting, illustrative examples of input device 914 include a mouse, a trackball, or cursor direction keys for communicating direction information and command selections to processor 904 and for controlling cursor movement on display 912. While only one input device 914 is depicted in FIG. 9, embodiments of the invention may include any number of input devices 914 coupled to computer system 900.

Embodiments of the invention are related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 904 for execution. For example, the instructions may initially be carried on a magnetic disk of a remote computer. The remote computer can load the instructions into its dynamic memory and send the instructions over a network link 920 to computer system 900.

Communication interface 918 provides a two-way data communication coupling to a network link 920 that is connected to a local network. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through a local network to a host computer or to data equipment operated by an Internet Service Provider (ISP).

Computer system 900 can send messages and receive data, including program code, through the network(s), network link 920 and communication interface 918. For example, a server might transmit a requested code for an application program through the Internet, a local ISP, a local network, subsequently to communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer readable storage medium storing one or more sequences of instructions, which when executed by one or more processors, causes:
    in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
    identifying one or more templates for use in instantiating said virtual machine based on a policy that considers a type of activity whose execution is being requested by the request and the provenance of the executable code for said application, wherein the one or more templates describe virtual machine characteristics configured for different types of activity, and
        wherein the one or more templates each reference a shared operating system image used to instantiate a plurality of operating system instances to each run in virtual machines created using the one or more templates; and
    after instantiating said virtual machine using said one or more templates, executing said application in said virtual machine.

2. The non-transitory computer readable storage medium of claim 1, wherein execution of the one or more sequences of instructions further causes:
    determining a particular set of hardware resources to make available to the virtual machine; and
    providing the virtual machine access to the particular set of hardware resources without providing access to any other hardware resources.

3. The non-transitory computer readable storage medium of claim 1, wherein execution of the one or more sequences of instructions further causes:
    determining a particular set of network resources to make available to the virtual machine; and
    providing the virtual machine access to the particular set of network resources without providing access to any other network resources.

4. A non-transitory computer readable storage medium storing one or more sequences of instructions, which when executed by one or more processors, causes:
    in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
    identifying one or more templates for use in instantiating said virtual machine based on a policy that considers a type of activity whose execution is being requested by the request, wherein the one or more templates describe virtual machine characteristics configured for different types of activity, and
        wherein the one or more templates each reference a shared operating system image used to instantiate a plurality of operating system instances to each run in virtual machines created using the one or more templates; and
    after instantiating said virtual machine using said one or more templates, executing said application in said virtual machine,
        wherein a firewall virtual machine provides said virtual machine access to a particular set of network resources available to said virtual machine, and wherein said firewall virtual machine implements a network access policy for a plurality of virtual machines on a physical device.

5. A non-transitory computer readable storage medium storing one or more sequences of instructions, which when executed by one or more processors, causes:
    in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
    identifying one or more templates for use in instantiating said virtual machine based on a policy that considers a type of activity whose execution is being requested by the request and user input accompanying the request, wherein the one or more templates describe virtual machine characteristics configured for different types of activity, and
        wherein the one or more templates each reference a shared operating system image used to instantiate a plurality of operating system instances to each run in virtual machines created using the one or more templates; and
    after instantiating said virtual machine using said one or more templates, executing said application in said virtual machine.

6. A non-transitory computer readable storage medium storing one or more sequences of instructions, which when executed by one or more processors, causes:
    in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
        identifying one or more templates for use in instantiating said virtual machine based on a policy that considers a type of activity whose execution is being requested by the request and a reputation of said application, wherein the one or more templates describe virtual machine characteristics configured for different types of activity, and wherein the one or more templates each reference a shared operating system image used to instantiate a plurality of operating system instances to each run in virtual machines created using the one or more templates; and after instantiating said virtual machine using said one or more templates, executing said application in said virtual machine.

7. A non-transitory computer readable storage medium storing one or more sequences of instructions, which when executed by one or more processors, causes:

in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:

identifying one or more templates for use in instantiating said virtual machine based on a policy that considers a type of activity whose execution is being requested by the request, wherein the one or more templates describe virtual machine characteristics configured for different types of activity, and wherein the one or more templates each reference a shared operating system image used to instantiate a plurality of operating system instances to each run in virtual machines created using the one or more templates;

after instantiating said virtual machine using said one or more templates, executing said application in said virtual machine;

monitoring the behavior of said application during execution of said application in said virtual machine; and customizing at least one of the one or more templates based on the behavior of said application during execution of said application in said virtual machine.

8. A non-transitory computer readable storage medium storing one or more sequences of instructions, which when executed by one or more processors, causes:

in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:

identifying one or more templates for use in instantiating said virtual machine based on a policy that considers a type of activity whose execution is being requested by the request, wherein the one or more templates describe virtual machine characteristics configured for different types of activity, and wherein the one or more templates each reference a shared operating system image used to instantiate a plurality of operating system instances to each run in virtual machines created using the one or more templates;

after instantiating said virtual machine using said one or more templates, executing said application in said virtual machine;

monitoring the behavior of said application during execution; and updating the policy based on the behavior of said application during execution of said application.

9. An apparatus, comprising:

one or more processors; and one or more non-transitory computer-readable storage mediums storing one or more sequences of instructions, which when executed, cause:

in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:

identifying one or more templates for use in instantiating said virtual machine based on a policy that considers a type of activity whose execution is being requested by the request and the provenance of the executable code for said application, wherein the one or more templates describe virtual machine characteristics configured for different types of activity, and wherein the one or more templates each reference a shared operating system image used to instantiate a plurality of operating system instances to each run in virtual machines created using the one or more templates; and after instantiating said virtual machine using said one or more templates, executing said application in said virtual machine.

10. The apparatus of claim 9, wherein execution of the one or more sequences of instructions further causes:

determining a particular set of hardware resources to make available to the virtual machine; and providing the virtual machine access to the particular set of hardware resources without providing access to any other hardware resources.

11. The apparatus of claim 9, wherein execution of the one or more sequences of instructions further causes:

determining a particular set of network resources to make available to the virtual machine; and providing the virtual machine access to the particular set of network resources without providing access to any other network resources.

12. An apparatus, comprising:

one or more processors; and one or more non-transitory computer-readable storage mediums storing one or more sequences of instructions, which when executed, cause:

in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:

identifying one or more templates for use in instantiating said virtual machine based on a policy that considers a type of activity whose execution is being requested by the request, wherein the one or more templates describe virtual machine characteristics configured for different types of activity, and wherein the one or more templates each reference a shared operating system image used to instantiate a plurality of operating system instances to each run in virtual machines created using the one or more templates; and after instantiating said virtual machine using said one or more templates, executing said application in said virtual machine,
wherein a firewall virtual machine provides said virtual machine access to a particular set of network resources available to said virtual machine, and wherein said firewall virtual machine implements a network access policy for a plurality of virtual machines on a physical device.

13. An apparatus, comprising:
one or more processors; and
one or more non-transitory computer-readable storage mediums storing one or more sequences of instructions, which when executed, cause:
in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
identifying one or more templates for use in instantiating said virtual machine based on a policy that considers a type of activity whose execution is being requested by the request and user input accompanying the request, wherein the one or more templates describe virtual machine characteristics configured for different types of activity, and
wherein the one or more templates each reference a shared operating system image used to instantiate a plurality of operating system instances to each run in virtual machines created using the one or more templates; and
after instantiating said virtual machine using said one or more templates, executing said application in said virtual machine.

14. An apparatus, comprising:
one or more processors; and
one or more non-transitory computer-readable storage mediums storing one or more sequences of instructions, which when executed, cause:
in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
identifying one or more templates for use in instantiating said virtual machine based on a policy that considers a type of activity whose execution is being requested by the request and a reputation of said application, wherein the one or more templates describe virtual machine characteristics configured for different types of activity, and
wherein the one or more templates each reference a shared operating system image used to instantiate a plurality of operating system instances to each run in virtual machines created using the one or more templates; and
after instantiating said virtual machine using said one or more templates, executing said application in said virtual machine.

15. An apparatus, comprising:
one or more processors; and
one or more non-transitory computer-readable storage mediums storing one or more sequences of instructions, which when executed, cause:
in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
identifying one or more templates for use in instantiating said virtual machine based on a policy that considers a type of activity whose execution is being requested by the request, wherein the one or more templates describe virtual machine characteristics configured for different types of activity, and
wherein the one or more templates each reference a shared operating system image used to instantiate a plurality of operating system instances to each run in virtual machines created using the one or more templates;
after instantiating said virtual machine using said one or more templates, executing said application in said virtual machine;
monitoring the behavior of said application during execution of said application in said virtual machine; and
customizing at least one of the one or more templates based on the behavior of said application during execution of said application in said virtual machine.

16. An apparatus, comprising:
one or more processors; and
one or more non-transitory computer-readable storage mediums storing one or more sequences of instructions, which when executed, cause:
in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
identifying one or more templates for use in instantiating said virtual machine based on a policy that considers a type of activity whose execution is being requested by the request, wherein the one or more templates describe virtual machine characteristics configured for different types of activity, and
wherein the one or more templates each reference a shared operating system image used to instantiate a plurality of operating system instances to each run in virtual machines created using the one or more templates;
after instantiating said virtual machine using said one or more templates, executing said application in said virtual machine;
monitoring the behavior of said application during execution; and
updating the policy based on the behavior of said application during execution of said application.

17. A method, comprising:
in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:

identifying one or more templates for use in instantiating said virtual machine based on a policy that considers a type of activity whose execution is being requested by the request and the provenance of the executable code for said application, wherein the one or more templates describe virtual machine characteristics configured for different types of activity, and wherein the one or more templates each reference a shared operating system image used to instantiate a plurality of operating system instances to each run in virtual machines created using the one or more templates; and after instantiating said virtual machine using said one or more templates, executing said application in said virtual machine.

18. The method of claim 17, further comprising:
determining a particular set of hardware resources to make available to the virtual machine; and
providing the virtual machine access to the particular set of hardware resources without providing access to any other hardware resources.

19. The method of claim 17, further comprising:
determining a particular set of network resources to make available to the virtual machine; and
providing the virtual machine access to the particular set of network resources without providing access to any other network resources.

20. A method, comprising:
in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
identifying one or more templates for use in instantiating said virtual machine based on a policy that considers a type of activity whose execution is being requested by the request, wherein the one or more templates describe virtual machine characteristics configured for different types of activity, and
wherein the one or more templates each reference a shared operating system image used to instantiate a plurality of operating system instances to each run in virtual machines created using the one or more templates; and
after instantiating said virtual machine using said one or more templates, executing said application in said virtual machine,
wherein a firewall virtual machine provides said virtual machine access to a particular set of network resources available to said virtual machine, and wherein said firewall virtual machine implements a network access policy for a plurality of virtual machines on a physical device.

21. A method, comprising:
in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
identifying one or more templates for use in instantiating said virtual machine based on a policy that considers a type of activity whose execution is being requested by the request and user input accompanying the request, wherein the one or more templates describe virtual machine characteristics configured for different types of activity, and
wherein the one or more templates each reference a shared operating system image used to instantiate a plurality of operating system instances to each run in virtual machines created using the one or more templates; and
after instantiating said virtual machine using said one or more templates, executing said application in said virtual machine.

22. A method, comprising:
in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
identifying one or more templates for use in instantiating said virtual machine based on a policy that considers a type of activity whose execution is being requested by the request and a reputation of said application, wherein the one or more templates describe virtual machine characteristics configured for different types of activity, and
wherein the one or more templates each reference a shared operating system image used to instantiate a plurality of operating system instances to each run in virtual machines created using the one or more templates; and
after instantiating said virtual machine using said one or more templates, executing said application in said virtual machine.

23. A method, comprising:
in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:
identifying one or more templates for use in instantiating said virtual machine based on a policy that considers a type of activity whose execution is being requested by the request, wherein the one or more templates describe virtual machine characteristics configured for different types of activity, and
wherein the one or more templates each reference a shared operating system image used to instantiate a plurality of operating system instances to each run in virtual machines created using the one or more templates;
after instantiating said virtual machine using said one or more templates, executing said application in said virtual machine;
monitoring the behavior of said application during execution of said application in said virtual machine; and
customizing at least one of the one or more templates based on the behavior of said application during execution of said application in said virtual machine.

24. A method, comprising:
in response to receiving a request to execute an application, instantiating a virtual machine in which the application is to be executed, wherein instantiating said virtual machine is performed without receiving an explicit user instruction to instantiate said virtual machine, and wherein instantiating said virtual machine further comprises:

identifying one or more templates for use in instantiating said virtual machine based on a policy that considers a type of activity whose execution is being requested by the request, wherein the one or more templates describe virtual machine characteristics configured for different types of activity, and
- wherein the one or more templates each reference a shared operating system image used to instantiate a plurality of operating system instances to each run in virtual machines created using the one or more templates;

after instantiating said virtual machine using said one or more templates, executing said application in said virtual machine;

monitoring the behavior of said application during execution; and updating the policy based on the behavior of said application during execution of said application.

* * * * *